United States Patent
Chang et al.

(10) Patent No.: US 8,364,288 B2
(45) Date of Patent: Jan. 29, 2013

(54) APPARATUS AND METHOD OF SYNCHRONIZING AND INTERPOLATING AXES OF MULTI-SYSTEM

(75) Inventors: Wan-Kun Chang, Longjing Township, Taichung County (TW); Chin-Chu Sun, Taichung (TW); Shih-Chang Liang, Changhua (TW); Chih-Yuan Hsu, Dashu Township, Kaohsiung County (TW); Hsin-Chuan Su, Mailiao Township, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 264 days.

(21) Appl. No.: 12/794,862

(22) Filed: Jun. 7, 2010

(65) Prior Publication Data

US 2011/0137434 A1  Jun. 9, 2011

(30) Foreign Application Priority Data

Dec. 4, 2009 (TW) ................................ 98141612 A (51) Int. Cl.
  *G05B 19/18* (2006.01)
  *G05B 19/42* (2006.01)
(52) U.S. Cl. .............................. 700/61; 700/189; 700/86
(58) Field of Classification Search ........................ None
  See application file for complete search history.

(56) References Cited

U.S. PATENT DOCUMENTS

| | | | | |
|---|---|---|---|---|
| 3,686,556 A * | 8/1972 | Anger et al. | ...................... | 700/78 |
| 3,732,474 A * | 5/1973 | Anger et al. | ................... | 318/257 |
| 3,775,654 A * | 11/1973 | Anger et al. | ................... | 318/599 |
| 3,932,796 A * | 1/1976 | Kreithen et al. | .............. | 700/188 |
| 4,120,583 A * | 10/1978 | Hyatt | ............................. | 700/192 |
| 4,214,823 A * | 7/1980 | Pritchard | ......................... | 352/87 |
| 4,262,336 A * | 4/1981 | Pritchard | ...................... | 700/189 |
| 4,310,878 A * | 1/1982 | Hyatt | .............................. | 700/78 |

(Continued)

FOREIGN PATENT DOCUMENTS

| | | |
|---|---|---|
| JP | 62-105203 | 5/1987 |
| JP | 2-110709 | 4/1990 |

(Continued)

OTHER PUBLICATIONS

Shi, D.; Wang, B.; and Wu, H.; "A Novel Design of Distributed Servo System Based on Rearranging Functions Between Host Controller and Servo Driver", Aug. 2007, Proceedings of the IEEE International Conference on Automation and Logistics, Jinan, China.*

(Continued)

*Primary Examiner* — Mohammad Ali
*Assistant Examiner* — Kelvin Booker
(74) *Attorney, Agent, or Firm* — McClure, Qualey & Rodack, LLP (57) ABSTRACT

An apparatus and a method of synchronizing and interpolating axes of a multi-system are provide. According to the number M of operating systems, the apparatus analyzes a multi-axis process program of N axes to generate M system process programs, wherein, N≧M≧2. A synchronous code is added to the M system process programs. According to the specifications of the operating systems, a delay time compensation program is added to the M system process programs to ensure the synchronization of the systems therebetween. The characteristics of the controllers and the servos of the operation systems are adjusted to unify the characteristics of the systems. The M system process programs are outputted to the operating systems correspondingly.

14 Claims, 8 Drawing Sheets

U.S. PATENT DOCUMENTS

| | | | |
|---|---|---|---|
| 4,449,196 A * | 5/1984 | Pritchard | 708/670 |
| 4,513,379 A * | 4/1985 | Wilson et al. | 700/181 |
| 4,590,572 A * | 5/1986 | Imanishi | 700/169 |
| 4,631,657 A * | 12/1986 | Hill et al. | 700/63 |
| 5,201,630 A * | 4/1993 | Ishida et al. | 318/568.18 |
| 5,218,549 A | 6/1993 | Kokura et al. | |
| 5,249,118 A * | 9/1993 | Smith | 700/63 |
| 5,355,062 A * | 10/1994 | Takizawa et al. | 318/568.1 |
| 5,565,748 A * | 10/1996 | Takizawa et al. | 318/568.1 |
| 5,596,256 A * | 1/1997 | Takizawa et al. | 318/600 |
| 5,631,531 A * | 5/1997 | Takizawa et al. | 318/568.25 |
| 5,715,429 A * | 2/1998 | Takizawa et al. | 700/182 |
| 5,812,432 A * | 9/1998 | Takizawa et al. | 700/170 |
| 5,859,515 A * | 1/1999 | Takizawa et al. | 318/568.1 |
| 5,966,897 A * | 10/1999 | Kirka et al. | 53/55 |
| 6,397,123 B1 * | 5/2002 | Miyajima et al. | 700/160 |
| 6,442,442 B1 * | 8/2002 | Weinhofer | 700/86 |
| 6,697,700 B2 * | 2/2004 | Nakaminami et al. | 700/194 |
| 6,728,595 B2 * | 4/2004 | Hamamura et al. | 700/188 |
| 6,757,583 B2 * | 6/2004 | Giamona et al. | 700/189 |
| 7,009,357 B2 * | 3/2006 | Mizuno et al. | 700/189 |
| 7,039,494 B2 * | 5/2006 | Otsuki et al. | 700/189 |
| 7,146,242 B2 * | 12/2006 | Weinhofer | 700/189 |
| 7,180,253 B2 * | 2/2007 | Weinhofer et al. | 318/34 |
| 7,445,587 B2 * | 11/2008 | Kojima et al. | 483/56 |
| 7,519,440 B2 * | 4/2009 | Weinhofer et al. | 700/86 |
| 7,738,977 B2 * | 6/2010 | Weinhofer et al. | 700/86 |
| 7,869,897 B2 * | 1/2011 | Otsuki et al. | 700/189 |
| 8,131,396 B2 * | 3/2012 | Yamada | 700/189 |
| 2004/0002778 A1 * | 1/2004 | Giamona et al. | 700/61 |
| 2004/0098160 A1 * | 5/2004 | Galburt et al. | 700/121 |
| 2005/0033459 A1 * | 2/2005 | Otsuki et al. | 700/61 |
| 2005/0067995 A1 * | 3/2005 | Weinhofer et al. | 318/574 |
| 2005/0071021 A1 * | 3/2005 | Weinhofer | 700/63 |
| 2006/0100723 A1 * | 5/2006 | Sun et al. | 700/61 |
| 2006/0271208 A1 * | 11/2006 | Weinhofer et al. | 700/17 |
| 2006/0282181 A1 * | 12/2006 | Weinhofer et al. | 700/83 |
| 2007/0225139 A1 * | 9/2007 | Kojima et al. | 483/1 |
| 2008/0094592 A1 * | 4/2008 | Shibazaki | 355/53 |
| 2008/0114492 A1 * | 5/2008 | Miegel et al. | 700/248 |
| 2008/0288103 A1 * | 11/2008 | Otsuki et al. | 700/189 |
| 2009/0157218 A1 * | 6/2009 | Otsuki et al. | 700/188 |
| 2009/0237431 A1 * | 9/2009 | Yan et al. | 347/9 |
| 2010/0185316 A1 * | 7/2010 | Yamada | 700/189 |
| 2010/0273397 A1 * | 10/2010 | Martin et al. | 451/5 |

FOREIGN PATENT DOCUMENTS

| | | |
|---|---|---|
| JP | 2006-53789 | 2/2006 |
| JP | 2008-310652 | 12/2008 |

OTHER PUBLICATIONS

Shenzhen Adtech Digital Control Tech Company, Ltd., "ADT-8948A1, 4-axle Motion Controlling Card, Technical Manual", Apr. 2009, Retrieved from the Internet on Sep. 12, 2012 at "www.adtechen.com".*

Bartos, F.J., "Synchronized Motion Relies on Special Controls", Oct. 2007, Control Engineering, Retrieved from the Internet on Sep. 12, 2012 at "www.controleng.com".*

Advantech Corporation, "Advantech Releases 3-Dimension Circular Interpolation, High Performance 4 and 6-axis Motion Control Cards", Sep. 2004, Advantech Industiral Automation Group News, Retrieved from the Internet on Sep. 12, 2012 at "www.automation.com".*

English language translation of abstract of JP 62-105203 (published May 15, 1987).

English language translation of abstract of JP 2-110709 (published Apr. 23, 1990).

English lanuage translation of abstract of JP 2006-53789 (published Feb. 23, 2006).

English language translation of abstract of JP 2008-310652 (published Dec. 25, 2008).

* cited by examiner

Fx: Velocity component of the velocity vector F in the X axis
Fy: Velocity component of the velocity vector F in the Y axis
Fz: Velocity component of the velocity vector F in the Z axis
Fa: Velocity component of the velocity vector F in the A axis Fc: Velocity component of the velocity vector F in the C axis
Fxyz: Resultant velocity vector of Fx, Fy, Fz
Fac: Resultant velocity vector of Fa, Fc

APPARATUS AND METHOD OF SYNCHRONIZING AND INTERPOLATING AXES OF MULTI-SYSTEM

This application claims the benefit of Taiwan application Serial No. 98141612, filed Dec. 4, 2009, the subject matter of which is incorporated herein by reference.

TECHNICAL FIELD

The disclosure relates in general to a synchronous interpolation apparatus and a method, and more particularly to an apparatus and a method of synchronizing and interpolating axes of a multi-system.

BACKGROUND OF THE INVENTION

In the export of tool machines, Taiwan is ranked number 5 in the world, and is only next to Germany, Japan, China and Italy. About fifty 5-axis process machines were presented by Taiwan and other participating countries in the International Tool Machine Exhibit, Taipei, 2009. This exhibit shows that Taiwan has matured technology in the manufacturing of 5-axis processing machines. However, due to the restrictions of weapon fabrication, the tool machine manufacturers in Taiwan are experiencing difficulties in the import and procurement of 5-axis controllers.

Since the 5-axis synchronous controllers are expensive, and the delivery in the import is not reliable, the delivery in the export of 5-axis processing machines may be delayed, hence jeopardizing the competiveness in export. If a user would like to expand a 3-axis CNC processing machine to perform 5-axis synchronous interpolation, the user can add an extra 2-axis machine to the original 3-axis machine. However, the existing controller needs to be replaced by a controller system which synchronizes and interpolates 5 axes. The multi-axis control system is disclosed in many patents, such as U.S. Pat. No. 5,218,549, in which the controller is equipped with two central processing units (CPUs) combined with elements such as internal timer and logic circuits for controlling multi-axis synchronous interpolation.

In the industrial machines, multi-axis synchronization control is required for some specific needs. To increase the number of synchronizing axes of the original system, the entire control system needs to be updated, and such update is costly and time-consuming. Under such circumstances, the user would find it hard to convert the existing 3-axis synchronization processing machine to a 5-axis or even multi-axis synchronization processing machine to fit actual needs.

SUMMARY OF THE INVENTION

The disclosure is directed to an apparatus and a method of synchronizing and interpolating axes of a multi-system. The apparatus of the disclosure is adaptable for augmentation and has high flexibility in replacement.

According to a first aspect of the present disclosure, a method of synchronizing and interpolating axes of a multi-system is provided with the following steps. According to the number M of operating systems, analyzing a multi-axis process program of N axes to generate M system process programs is provided, wherein, $N \geq M \geq 2$. A synchronous code is added to the M system process programs. Then, according to the specifications of the operating systems, a delay time compensation program is added to the M system process programs to ensure the synchronization of the systems therebetween. The characteristics of the controllers and the servos of the operation systems are adjusted to unify the characteristics of the systems. The M system process programs are outputted to the operating systems correspondingly.

According to a second aspect of the present disclosure, an apparatus of synchronizing and interpolating axes of a multi-system is provided. The apparatus of synchronizing and interpolating axes of a multi-system is electrically connected to multiple operating systems and includes a program syntax analyzing unit, a synchronous coding processing unit, a synchronization compensation processing unit and a process program generation outputting unit. The program syntax analyzing unit is used for analyzing the multi-axis process program of N axes to generate M system process programs according to the number M of operating systems, wherein, $N \geq M \geq 2$. The synchronous coding processing unit is used for adding a synchronous code to the M system process programs. The synchronization compensation processing unit is used for adding a delay time compensation program to the M system process programs to ensure the synchronization of the systems therebetween according to the specifications of the operating systems and for adjusting the characteristics of the controllers and the servos of the operation systems to unify the characteristics of the systems. The process program generation outputting unit is used for generating and outputting the M system process programs to the operating systems correspondingly.

The disclosure will become apparent from the following detailed description of the preferred but non-limiting embodiments. The following description is made with reference to the accompanying drawings.

DETAILED DESCRIPTION OF EMBODIMENTS

The present embodiment of the disclosure provides an apparatus and a method of synchronizing and interpolating axes of a multi-system. The CAD/CAM machine inputs a multi-axis process program (includes a process program for the movement in each axis) generated by a uni-system to the apparatus of synchronizing and interpolating axes of a multi-system of the present embodiment of the disclosure to decompose multiple operating systems into a number of system process program files used by the operating systems. During the decomposition process, according to the number of synchronizing axes of each operating system, the original multi-axis process program is separated, the velocity command for each single node of each operating system is re-calculated, and relevant synchronous codes and compensated waiting instructions are added to each operating system. Thus, the multi-axis process program of a uni-system can be decomposed into the process program required for each operating system. Then, each operating system can perform acceleration/deceleration to drive the motor set according to respective process program so as to achieve synchronous interpolation of multiple axes.

Figure 1:
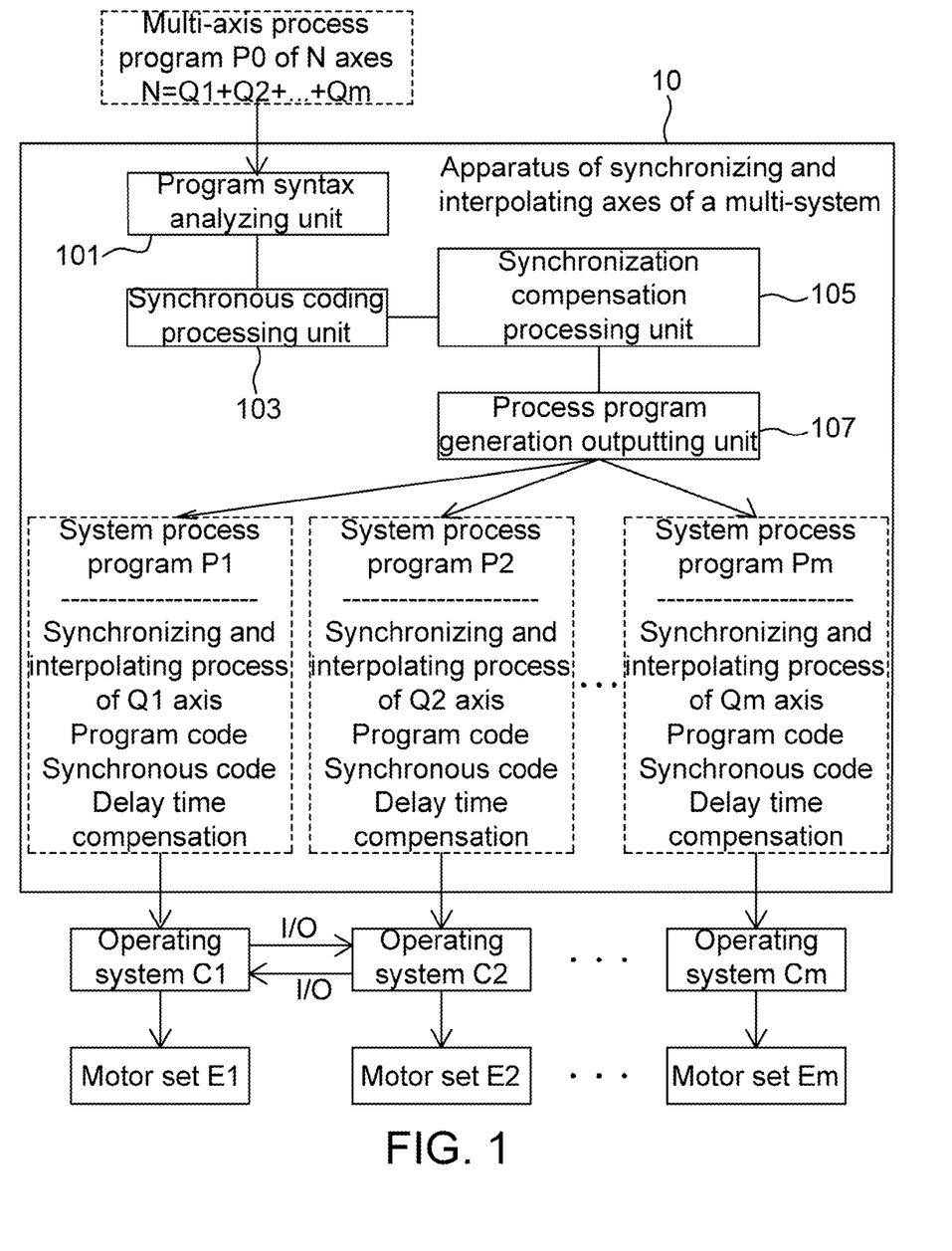
FIG. 1 shows a block diagram of the elements of an apparatus of synchronizing and interpolating axes of a multi-system according to a preferred embodiment of the disclosure.
Figure 2:
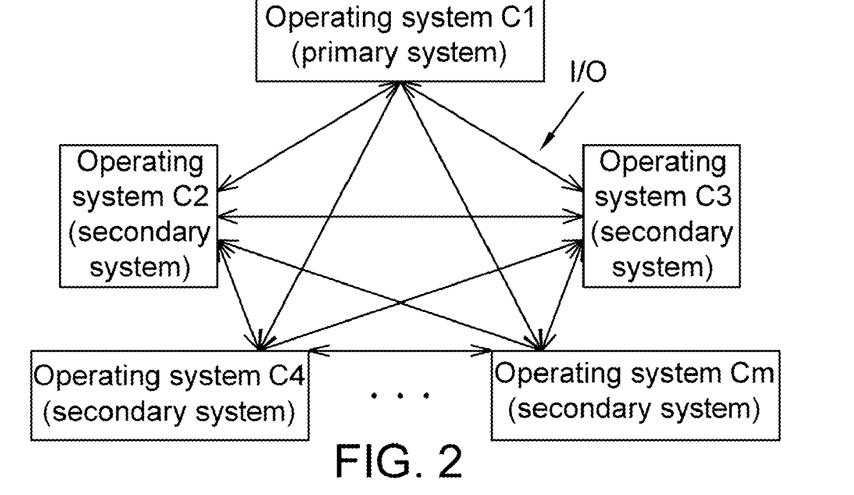
FIG. 2 shows the connection of the sync signal of multiple operating systems.

Referring to FIGS. 1 and 2. FIG. 1 shows a block diagram of the elements of an apparatus of synchronizing and interpolating axes of a multi-system according to a preferred embodiment of the disclosure. FIG. 2 shows the connection of the sync signal of multiple operating systems. As indicated in FIG. 1, the apparatus 10 of synchronizing and interpolating axes of a multi-system is electrically connected to multiple operating systems such as the operating systems C1~Cm. Each of the operating systems C1~Cm has its associated synchronizing axes such as the axes Q1~Qm.

The apparatus 10 of synchronizing and interpolating axes of a multi-system includes a program syntax analyzing unit 101, a synchronous coding processing unit 103, a synchronization compensation processing unit 105 and a process program generation outputting unit 107. The program syntax analyzing unit 101 is used for receiving a multi-axis process program P0 of N axes, and analyzing the multi-axis process program P0 to M system process programs, such as the system process programs P1~Pm, according to the number M of operating systems and the synchronizing axes Q1~Qm, wherein, $N \geq M \geq 2$, and $N=Q1+Q2+ \ldots +Qm$.

The synchronous coding processing unit 103 is used for adding a synchronous code to the system process programs P1~Pm. The synchronization compensation processing unit 105 is used for adjusting the system process programs P1~Pm according to the specifications of the operating systems to ensure the synchronization of the systems therebetween. Besides, the synchronization compensation processing unit 105 is used for adjusting the characteristics of the controllers and the servos of the system to unify the characteristics of the systems. The process program generation outputting unit 107 is used for generating and outputting the system process programs P1~Pm to the operating systems C1~Cm correspondingly. The operating systems C1~Cm respectively drive the motor sets E1~Em according to the system process programs P1~Pm.

As indicated in FIG. 2, during the control of the synchronous interpolation of multiple axes, the operating systems C1~Cm are mutually connected through fast I/O interfaces to inform each other of performing the synchronous interpolation. During the operation of the multiple operating systems C1~Cm, one of the operating systems, such as the operating system C1, must be the primary system and the remaining operating systems C2~Cm are secondary systems. During the operation, the secondary systems must execute programs first, and the primary system is the last to execute programs. Therefore, the operation of the primary system implies that the entire system starts operation. Detailed descriptions of the present embodiment of the method of synchronizing and interpolating axes of a multi-system are disclosed below.

Figure 3:
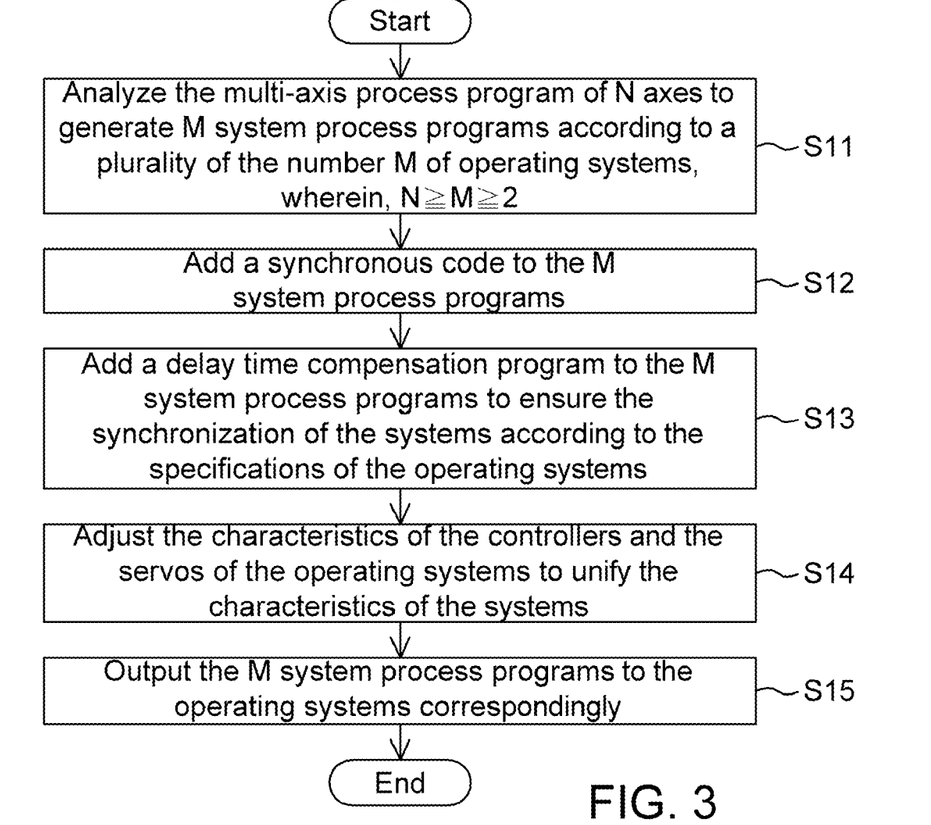
FIG. 3 shows a flowchart of a method of synchronizing and interpolating axes of a multi-system according to a preferred embodiment of the disclosure.
Figure 4:
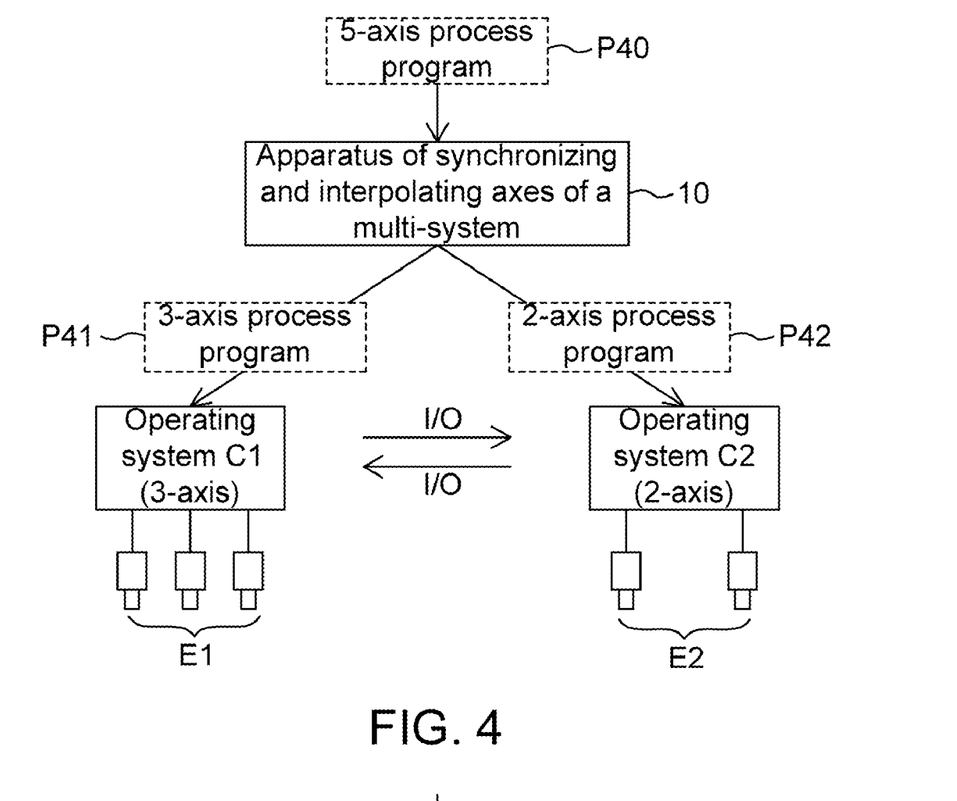
FIG. 4 shows a bi-system 5-axis synchronous interpolation adapted in an apparatus of synchronizing and interpolating axes of a multi-system.

Referring to FIG. 3, a flowchart of a method of synchronizing and interpolating axes of a multi-system according to a preferred embodiment of the disclosure is shown. The method includes steps S11~S15. Referring to FIG. 4, a bi-system 5-axis synchronous interpolation adapted in an apparatus of synchronizing and interpolating axes of a multi-system is shown.

As indicated in step S11 of FIG. 3, the multi-axis process program of N axes is analyzed to generate M system process programs according to the number M of multiple operating systems, wherein, N M 2. As indicated in FIG. 4, the apparatus 10 of synchronizing and interpolating axes of a multi-system connects the operating systems C1~C2. The operating system C1 is such as a 3-axis synchronous system, and the operating system C2 is such as a 2-axis synchronous system. Thus, after a 5-axis process program P40 is processed by the apparatus 10 of synchronizing and interpolating axes of a multi-system, a 3-axis process program P41 and a 2-axis process program P42 are correspondingly generated and inputted to the operating systems C1~C2.

Figure 5:
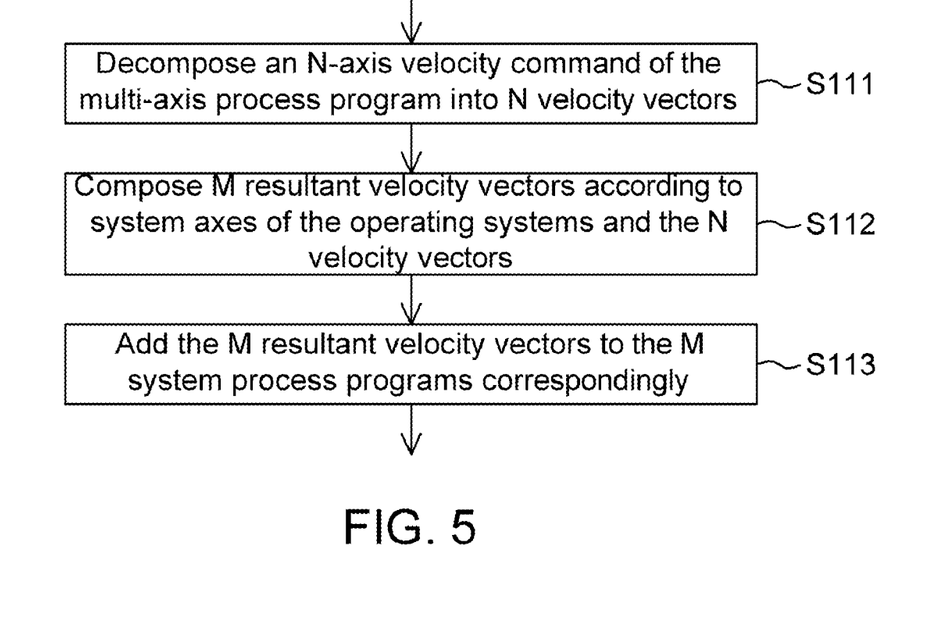
FIG. 5 shows a flowchart of analyzing the multi-axis process program of FIG. 4.

When the N-axis synchronous process program of a uni-system is decomposed into multiple system process programs, it is crucial to decide the movement velocity command for each system. Referring to FIG. 5, a flowchart of analyzing the multi-axis process program of FIG. 4 is sown. Step S11 of FIG. 5 to analyze the multi-axis process program of N axes to generate M system process programs further includes sub-steps S111~S113. As indicated in step S111, an N-axis velocity command of multi-axis process program is decomposed into N velocity vectors. Next, as indicated in step S112, M resultant velocity vectors are composed according to the system axes of the operating systems. Then, as indicated in step S113, the M resultant velocity vectors are added to the M system process programs correspondingly.

Figure 6:
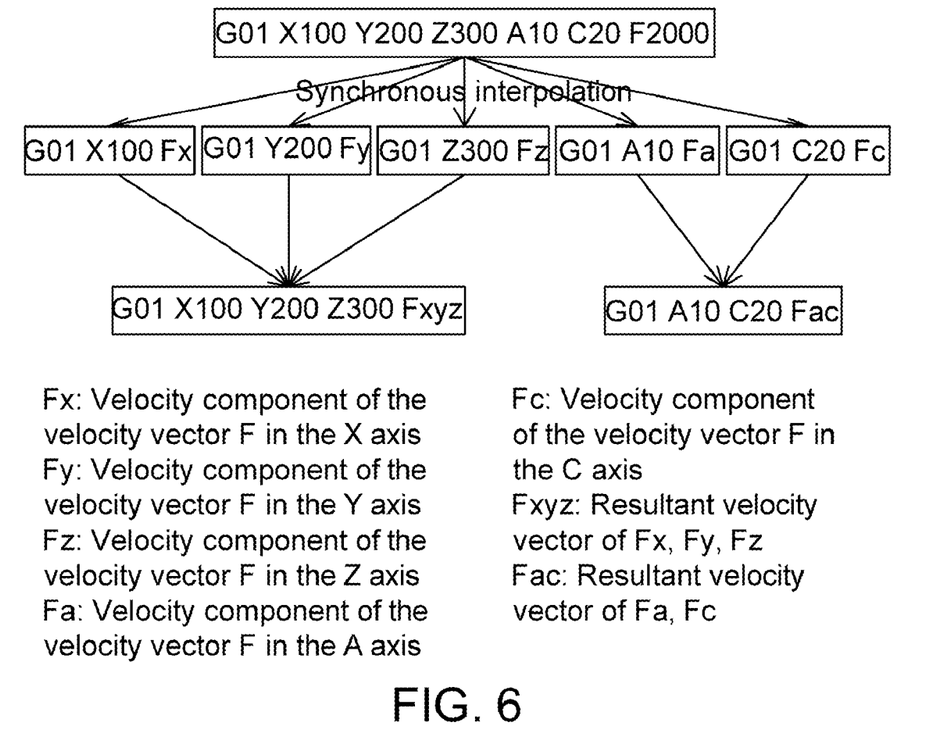
FIG. 6 shows a bi-system 5-axis synchronous interpolation adapted in the computation of a velocity command.

Referring to FIG. 6, bi-system 5-axis synchronous interpolation adapted in the computation of a velocity command is shown. As indicated in FIG. 6, the 5-axis velocity command (G01 X100 Y200 Z300 A10 C20 F2000) includes the movement instructions for the axes X, Y, Z, A, C. In step S111, the component in each axis of the movement velocity of the 5-axis synchronous interpolation of a uni-system is computed to obtain the instruction of the velocity component for the movement in each axis, namely, (G01 X100 Fx), (G01 Y200 Fy), (G01 Z300 Fz), (G01 A10 Fa), (G01 C20 Fc).

In step S112, suppose the synchronous axes of the operating system C1 are axes X, Y, and Z, and the synchronous axes of the operating system C2 are axes A and C. As indicated in FIG. 6, the first three velocity components, namely, Fx, Fy and Fz, are composed to form a resultant velocity vector Fxyz which generates a 3-axis velocity command (G01 X100 Y200 Z300 Fxyz). Besides, the 2-axis velocity components Fa and Fc are composed to form a resultant velocity vector Fac, which generates a 2-axis velocity command (G01 A10 C20 Fac).

Then, according to step S113, the 3-axis velocity command (G01 X100 Y200 Z300 Fxyz) and the 2-axis velocity command (G01 A10 C20 Fac) are added to the corresponding system process programs such as the 3-axis process program P41 and the 2-axis process program P42 (referring to FIG. 4). The above disclosure explains that the determination of the velocity command for each system remains the same when the velocity command computation exemplified by bi-system 5-axis synchronous interpolation is expanded to M-system N-axis synchronous interpolation.

Then, the method returns to the step S12 of FIG. 3, a synchronous code is added to the M system process programs. As indicated in FIG. 1, the synchronous code processor 103 adds the synchronous code to the system process programs P1~Pm. Or, as indicated in FIG. 4, the synchronous code is added to the 3-axis process program P41 and the 2-axis process program P42.

Then, as indicated in step S13 of FIG. 3, a delay time compensation program is added to the M system programs to ensure the synchronization of the systems therebetween according to the specifications of the operating systems. Let FIG. 1 be taken for example. The specifications of the operating systems C1~Cm are not exactly the same, and the operating systems C1~Cm are mutually connected through fast I/O interfaces. Signal delay may arise if the delay time compensation program is not added to each system through the synchronization compensation processing unit 105.

Figure 7:
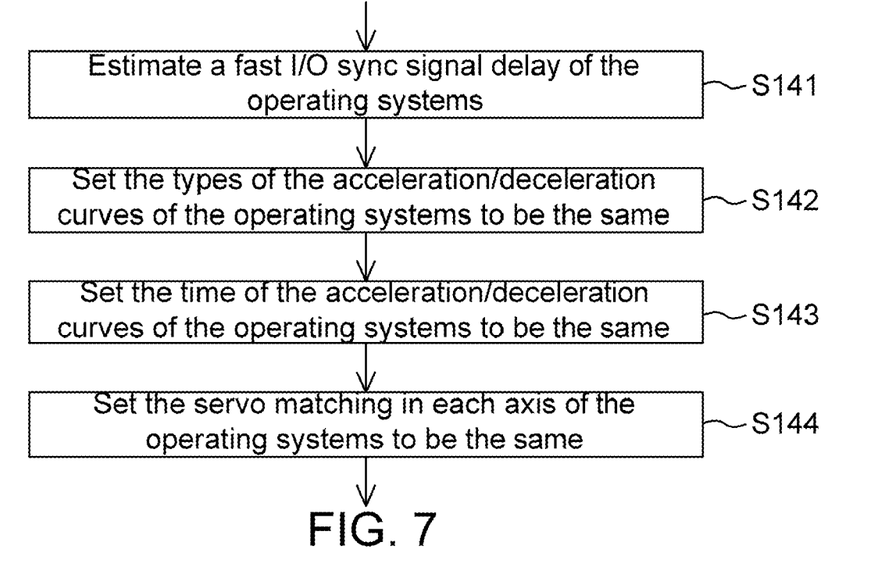
FIG. 7 shows a flowchart of unifying the characteristic of each operating system.

Next, as indicated in the step S14 of FIG. 3, the characteristics of the controllers and the servos of the operating systems are adjusted to unify the characteristics of the systems. The steps of unifying the characteristic of each operating system include substeps S141~S144. Referring to FIG. 7, a flowchart of unifying the characteristic of each operating system is shown. Despite the substeps S141~S144 are illustrated in FIG. 7 in order, the orders of these steps are not limited to the exemplification. For example, in step S141, fast I/O sync signal delay of the operating systems C1~Cm can be estimated, and then the delay time is added to the system process program. Step 141 avoids the synchronization of the operating systems C1~Cm being incapacitated to assure the synchronous mechanism.

After that, as indicated in step S142, the types of the acceleration/deceleration curves of the operating systems C1~Cm are set to be the same. Then, as indicated in step S143, the time of the acceleration/deceleration curves of the operating systems C1~Cm is set to be the same. Next, as indicated in step S144, the servo matching for each axis of the operating systems C1~Cm is set to be the same. The characteristics mentioned in steps S142~S144, such as the acceleration/deceleration curve type, the acceleration/deceleration curve time and the servo matching for each axis (such as system gain), can be obtained from the specifications of the controller of the operating system being used, and are then processed through the synchronization compensation processing unit 105.

Figure 8:
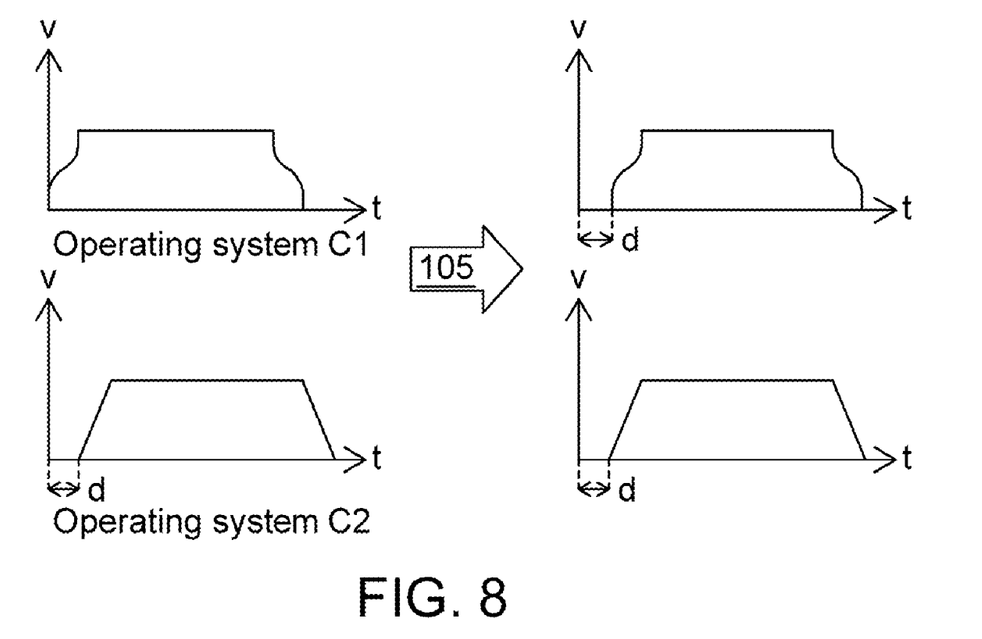
FIG. 8 shows the characteristics of the operating systems before and after unification.

Referring to FIG. 8, the characteristics of the operating systems before and after unification are shown. In the illustrated diagram, the vertical axis denotes velocity v, and the horizontal axis denotes time t. Let the operating systems C1 and C2 be taken for example. The initial characteristics, such as the types and the time of the acceleration/deceleration curves, are both different for the two systems, wherein, the operating system C2 has a delay time d, and the curve is not linear when the operating system C1 is activated, therefore, the two systems cannot be synchronized. After having been adjusted by the synchronization compensation processing unit 105, the operating system C1 also has a delay time d, and after the unification parameters are adjusted in steps S141~S144, the type of the acceleration/deceleration curve of the operating system C1 will be the same with that of the operating system C2.

Next, as indicated in step S15 of FIG. 3, the M system process programs are outputted to the operating systems correspondingly. As indicated in FIG. 1, the system process programs P1~Pm generated by the process program generation outputting unit 107 are outputted to the operating systems C1~Cm correspondingly. Preferably, the system process programs P1~Pm are transmitted to the operating systems for operation through RS232, Ethernet or Internet. The operating systems perform the computation and processing for synchronizing and interpolating multiple axes through fast I/O interfaces.

Figure 9A:
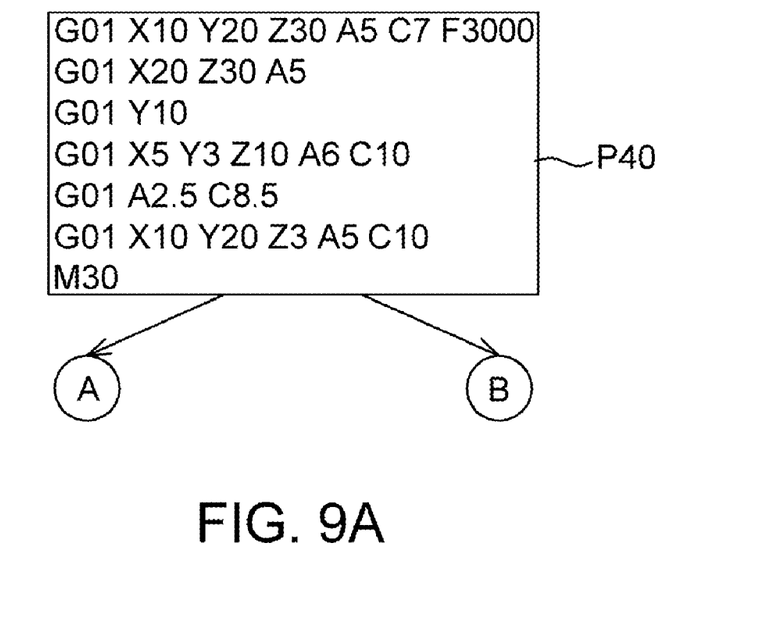
FIG. 9 shows a 5-axis process program being decomposed into one 3-axis process program and one 2-axis process program.
Figure 9B:
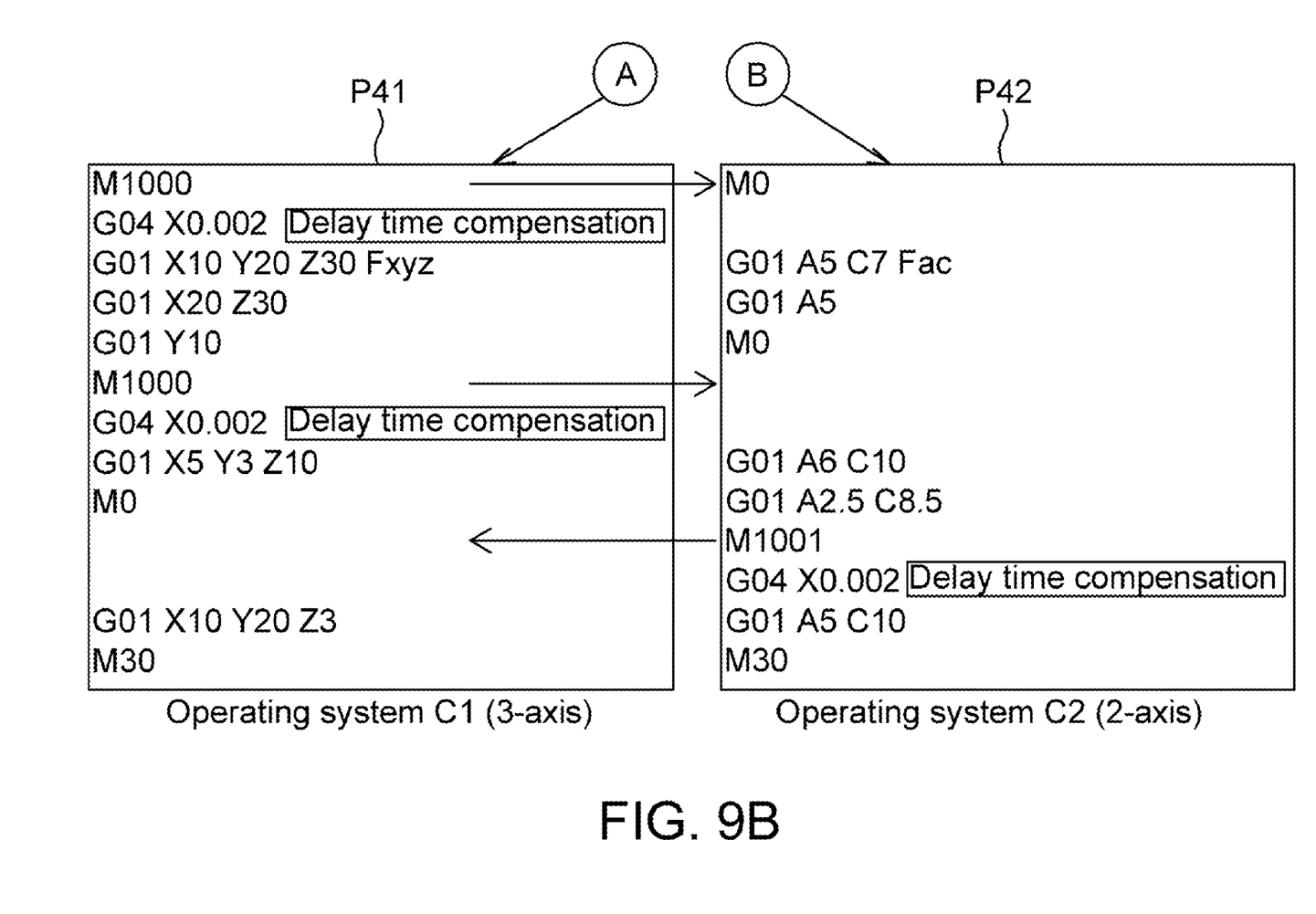

Let the system of FIG. 4 be taken for example. Referring to FIG. 9, a 5-axis process program P40 being decomposed into one 3-axis process program P41 and one 2-axis process program P42 is shown. When two operating systems C1 and C2 are operating, suppose the operating system C1 is a primary system, and the operating system C2 is a secondary system. The operating system C2, being a secondary system, must execute programs first and then the operating system C1, being a primary system, executes programs next. When the system C2 executes programs, the system C2 enters program pause M0, and waits for the system C1 to execute the programs. When the system C1 executes programs, the M1000 (the first column of the program code, wherein the M code can be set by the user) will inform the system C2 through fast I/O interface to synchronize the programs, and then perform synchronous interpolation respectively. If the program pause M0 (the ninth column of the program code) occurs to the system C1, the system C2 can inform the system C1 (the tenth column of the program code) by the M1001 through fast I/O interface to synchronize the programs, and then perform synchronous interpolation respectively.

Figure 10A:
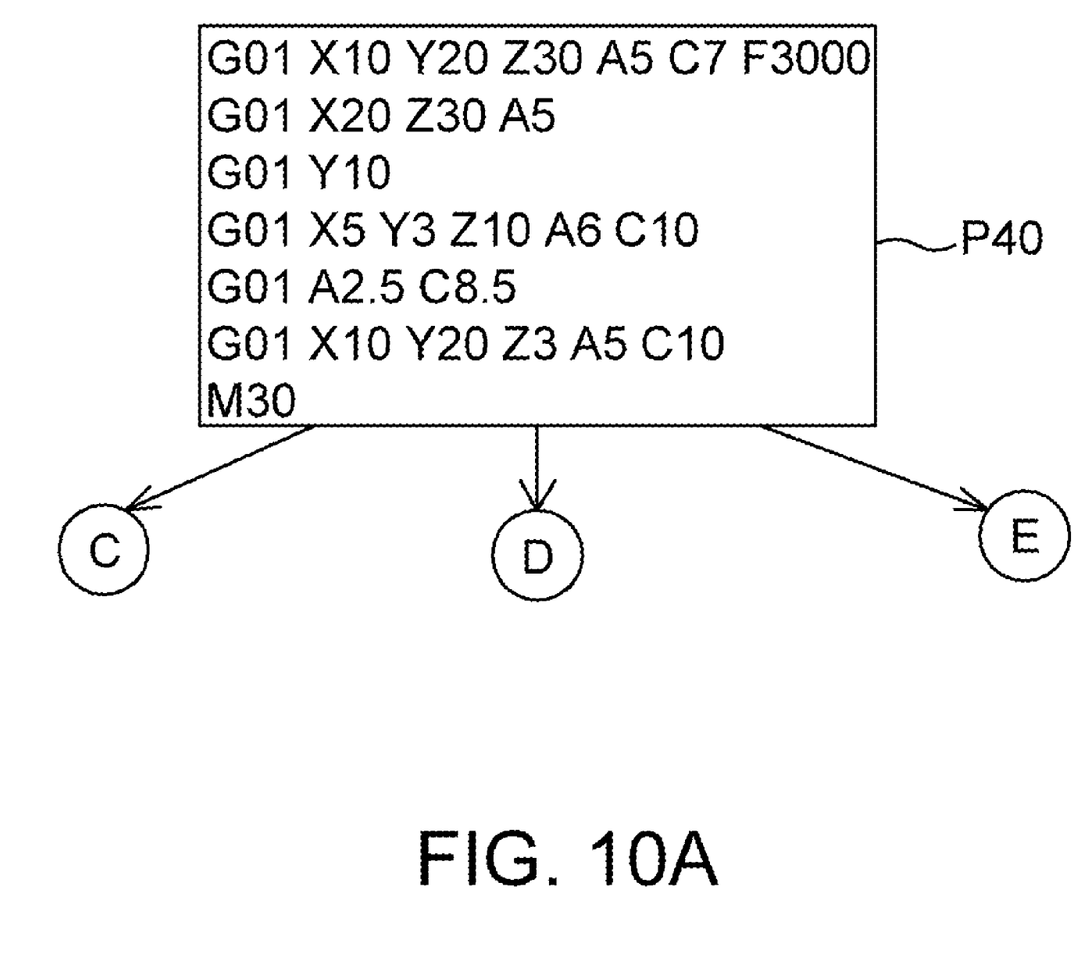
FIG. 10 shows a 5-axis process program being decomposed into two 2-axis process programs and one 1-axis process program.
Figure 10B:
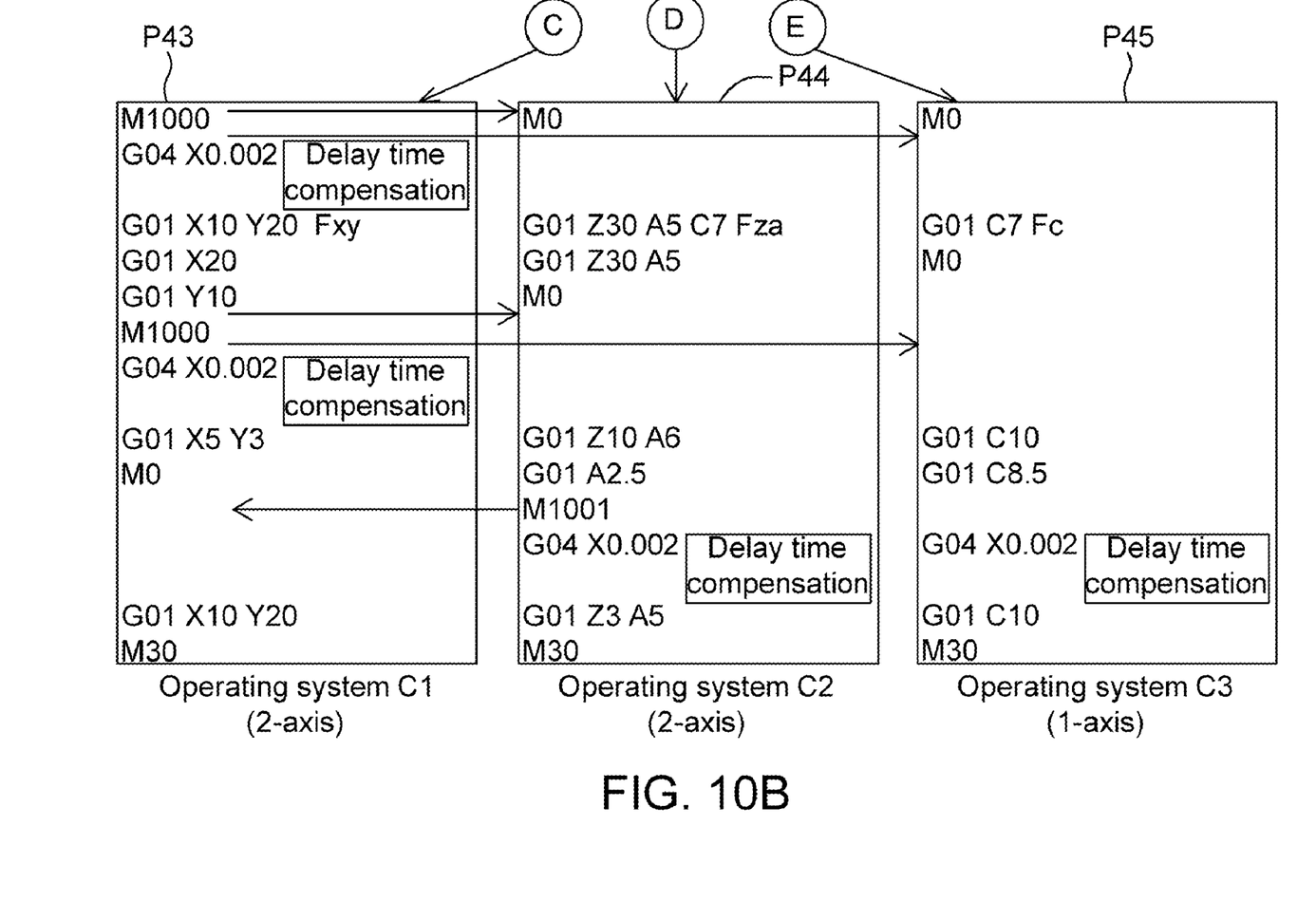

Besides, as indicated in FIG. 10, a 5-axis process program P40 being decomposed into two 2-axis process programs P43 and one 1-axis process program P45 is shown, wherein, the corresponding operating system C1 of the 2-axis process program P43 is a primary system. The 2-axis process program P43 is an XY-axis synchronization program, the 2-axis process program P44 is a ZA-axis synchronization program, and the 1-axis process program P45 is a C-axis program. The operation of each operating system is disclosed below.

When three operating systems are operating, the system C1 (the primary system) informs the systems C2 and C3 to synchronize (the first column of the program code). The system C1, according to the instruction of synchronous time compensation, will not operate until the systems C2 and C3 operate (the second column of the program code). Next, the three systems perform synchronous interpolation respectively to achieve 5-axis synchronization (the third column of the program code). Then, the system C3 pauses, and only the systems C1 and C2 perform 3-axis synchronization (the fourth column of the program code). Next, the systems C2 and C3 pause, and only the system C1 performs 1-axis synchronization (the fifth column of the program code). Then, the system C1 informs the systems C2 and C3 to perform synchronization (the sixth column of the program code). Meanwhile, the system C1, according to the instruction of the synchronous time compensation (the seventh column of the program code), does not operate until the systems C2 and C3 operate. Next, the three systems again perform synchronous interpolation respectively to achieve 5-axis synchronization (the eighth column of the program code). Then, the system C1 pauses, and the systems C2 and C3 perform 2-axis synchronization (the ninth column of the program code). Next, the system C2 informs the system C1 to perform synchronization (the tenth column of the program code). Meanwhile, the systems C2 and C3, according to the instruction of the synchronous time compensation, do not operate until the system C1 operates (the eleventh column of the program code). Then, the three systems then again perform synchronous interpolation respectively to achieve 5-axis synchronization (the twelfth column of the program code). After the above operation is completed, the programs terminate (the thirteenth column of the program code).

According to the apparatus and the method of synchronizing and interpolating axes of a multi-system disclosed in the above embodiments of the disclosure, the apparatus can be viewed as a pre-processor, which converts the multi-axis process program into the process program files used in different systems. Furthermore, the fast I/O interface of the controller of each operating system is used for synchronous communication between multiple systems to achieve synchronous interpolation of multiple axes computation.

According to the convention synchronization of synchronous interpolation of multiple axes, the instruction of the synchronous interpolation of multiple axes is fed to a single controller of the system in one time under a uni-system, so that the single controller performs synchronous interpolation control on the control axis of the servo. Currently, in the part of the multi-axis synchronous controller, the controller of 5-axis synchronization CNC processing machine is not only hard to obtain but also too costly to most manufacturers.

The apparatus of synchronizing and interpolating axes of a multi-system disclosed in the above embodiments of the disclosure can directly integrate the computation of synchronous interpolation of multiple axes of a multi-system with the existing 1-axis, 2-axis and 3-axis controllers without having to replace the controllers of a multi-axis process system. For example, according to the present embodiment of the disclosure, the 3-axis primary system can be directly integrated with other 2-axis or 1-axis secondary system, so that the number of synchronizing axes can be increased in response to the need of multi-axis process. Compared with the ordinary multi-axis interpolation, the apparatus of the present embodiment of the disclosure, having the advantages of better adaptability in augmentation, higher flexibility in replacement, and lower cost, further increases the competiveness of the products.

While the disclosure has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of synchronizing and interpolating axes of a multi-system, wherein the method comprises:
   analyzing a multi-axis process program of N axes to generate M system process programs according to a number M of a plurality of operating systems and synchronizing axes Q1~Qm of each operating system, wherein, N≧M≧2 and N=Q1+Q2+ . . . +Qm, each of the operating systems includes at least one controller and at least one servo;
   adding a synchronous code to the M system process programs;
   adding a delay time compensation program to the M system process programs to ensure a synchronization of the systems therebetween according to specifications of the operating systems;
   adjusting characteristics of the controllers and the servos of the operating systems to unify the characteristics of the systems; and
   outputting the M system process programs to the operating systems correspondingly to achieve synchronous interpolation of multiple axes.

2. The method according to claim 1, wherein, the step of analyzing the multi-axis process program comprises:
   decomposing an N-axis velocity command of the multi-axis process program into N velocity vectors;
   composing M resultant velocity vectors according to system axes of the operating systems and the N velocity vectors; and
   adding the M resultant velocity vectors to the M system process programs correspondingly.

3. The method according to claim 1, wherein, the step of adding a synchronous code to the M system process programs comprises:
   adding a synchronous code to the M system process programs.

4. The method according to claim 1, wherein, the step of unifying the characteristics of the operating systems comprises:
   estimating a fast I/O sync signal delay of the operating systems.

5. The method according to claim 1, wherein, the step of unifying the characteristics of the operating systems comprises:
   setting types of the acceleration/deceleration curves of the operating systems to be the same.

6. The method according to claim 1, wherein, the step of unifying the characteristics of the operating systems comprises:
   setting a time of the acceleration/deceleration curves of the operating systems to be the same.

7. The method according to claim 1, wherein, the step of unifying the characteristics of the operating systems comprises:
   setting a servo matching in each axis of the operating systems to be the same.

8. An apparatus of synchronizing and interpolating axes of a multi-system, wherein the apparatus is electrically connected to a plurality of operating systems and comprises:
   a program syntax analyzing unit for analyzing a multi-axis process program of N axes to generate M system process programs according to a number M of operating systems and synchronizing axes Q1~Qm of each operating system, wherein, N≧M≧2, and N=Q1+Q2+ . . . +Qm, each of the operating systems includes at least one controller and at least one servo;
   a synchronous coding processing unit for adding a synchronous code to the M system process programs;
   a synchronization compensation processing unit for adding a delay time compensation program to the M system process programs to ensure the synchronization of the systems therebetween according to specifications of the operating systems and for adjusting characteristics of the controllers and the servos of the operating systems to unify the characteristics of the systems; and
   a process program generation outputting unit for generating and outputting the M system process programs to the operating systems correspondingly to achieve synchronous interpolation of multiple axes.

9. The apparatus according to claim 8, wherein, the program syntax analyzing unit decomposes an N-axis velocity command of the multi-axis process program into N velocity vectors and composes M resultant velocity vectors according to system axes of the operating systems and the N velocity vectors, and further adds the M resultant velocity vectors to the M system process programs correspondingly.

10. The apparatus according to claim 8, wherein, the synchronous coding processing unit adds a synchronous code to the M system process programs.

11. The apparatus according to claim 8, wherein, the synchronization compensation processing unit estimates a fast Input/Output sync signal delay of the operating systems.

12. The apparatus according to claim 8, wherein, the synchronization compensation processing unit sets types of the acceleration/deceleration curves of the operating systems to be the same.

13. The apparatus according to claim 8, wherein, the synchronization compensation processing unit sets a time of the acceleration/deceleration curves of the operating systems to be the same.

14. The apparatus according to claim 8, wherein, the synchronization compensation processing unit sets a servo matching in each axis of the operating systems to be the same.

* * * * *